United States Patent [19]

Berg

[11] 4,116,458
[45] Sep. 26, 1978

[54] REVERSIBLE SWAY LIMITING BLOCKS FOR A TRACTOR HITCH

[75] Inventor: David A. Berg, Milwaukee, Wis.

[73] Assignee: Allis-Chalmers Corporation, Milwaukee, Wis.

[21] Appl. No.: 853,090

[22] Filed: Nov. 21, 1977

[51] Int. Cl.² ............................................ A01B 59/043
[52] U.S. Cl. ...................................... 280/474; 172/450
[58] Field of Search ............... 280/474, 446 R, 446 A, 280/415 R; 172/450, 457

[56] References Cited

U.S. PATENT DOCUMENTS

| 2,987,126 | 6/1961 | Horney | 280/474 |
|---|---|---|---|
| 3,047,076 | 7/1962 | Wier | 280/474 |
| 3,721,302 | 3/1973 | Buchmuller | 280/474 |

*Primary Examiner*—Joseph F. Peters, Jr.
*Assistant Examiner*—R. Schrecengost
*Attorney, Agent, or Firm*—Arthur L. Nelson

[57] ABSTRACT

A sway limiting device for a three-point hitch on a tractor having reversible sway limiting blocks. The sway limiting blocks in one position permit sway of the hitch and implement under field operating conditions and in another position eliminate sway of the hitch throughout the fulllift range of the hitch by interchanging the right and left-hand sway blocks and using the reverse side of the sway blocks.

10 Claims, 6 Drawing Figures

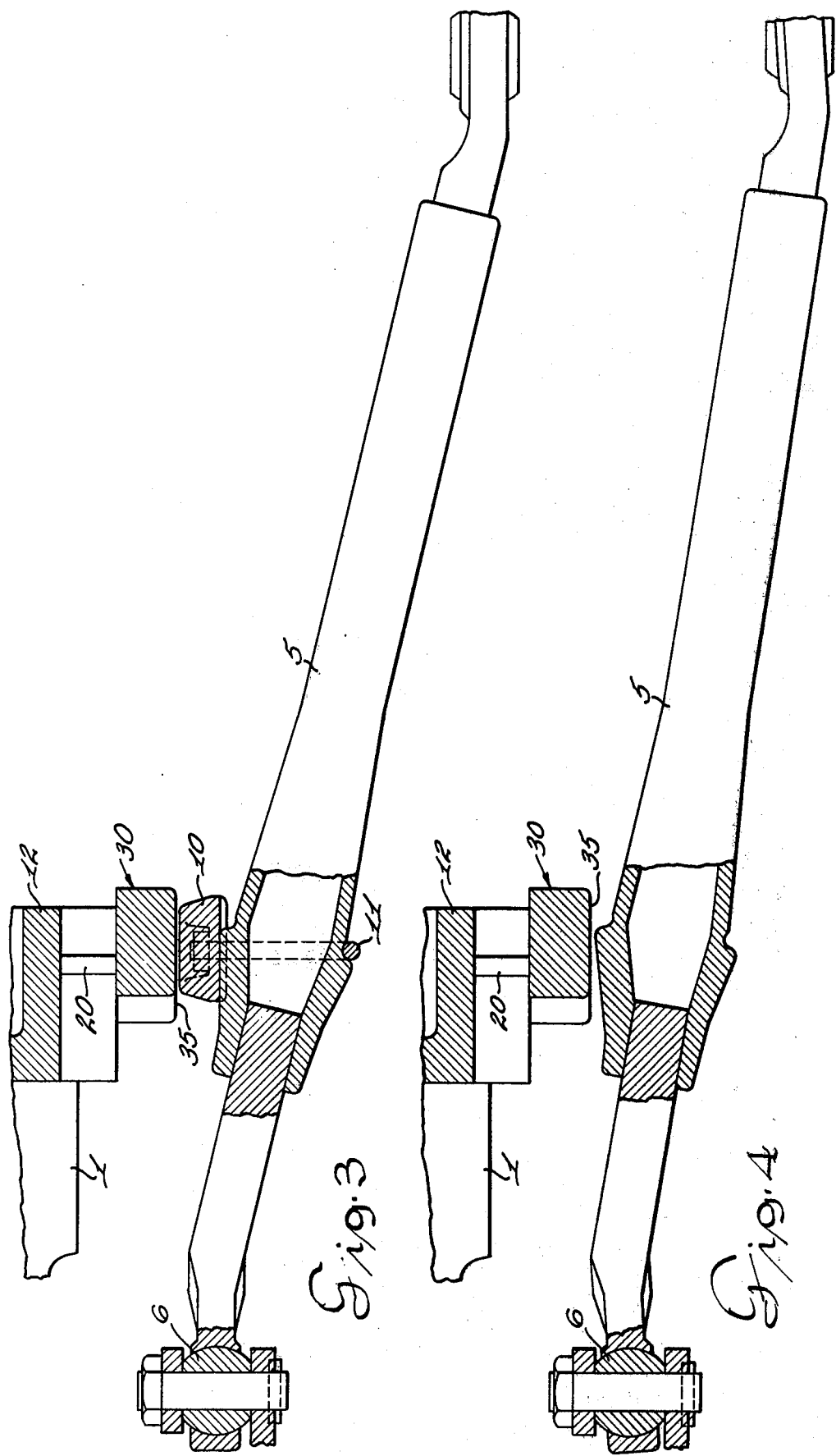

REVERSIBLE SWAY LIMITING BLOCKS FOR A TRACTOR HITCH

This invention relates to a tractor hitch and more particularly to the use of reversible sway blocks with the lower draft arms of a three-point hitch to permit sway of the hitch and implement under field operating conditions in one position and to eliminate sway of the hitch in the raised position and by reversing the sway blocks from one side of the tractor to the other and using the reverse side of the sway blocks to prevent sway of the hitch in any position throughout the full lift range.

Conventional means of coupling a tractor to a trail-behind implement are through the use of a drawbar or a three-point hitch. The three-point hitch normally is universally connected to the tractor to permit a certain degree of sway of the implement during field operation. The universal connection of the three-point hitch to the tractor also permits the hitch to be raised to lift a portion of the trail-behind implement when in the traveling position. The semi-mounted implement also requires a lift on the hitch in order to raise the implement from its operating position to the travel position. Under some operating conditions it is desirable to restrict the sway of the hitch and implement even when the hitch is in the lowered position. Accordingly, some means to provide a sway limiting of the implement in the raised or transport position is desirable with the option of restricting or permitting sway in the field operating position.

Accordingly, this invention provides for sway blocks adapted for mounting on the drawbar bail to permit swaying of the hitch and implement in the operating position, or restrict the sway in the operating and the raised or transport position. This invention provides sway blocks mounted on the drawbar bail which can be used for engagement of the lower draft arms to control the sway of the implement for one category of operation or the use of the wear plates which adapt the hitch for use of a larger category of operation in which the rear ends of the lower draft arms have a greater transverse dimension between the ends of the draft arms.

It is an object of this invention to provide reversible sway limiting blocks for controlling the sway of the lower draft arms of a three-point hitch on a tractor.

It is another object of this invention to provide a sway limiting device for a three-point hitch including reversible sway blocks permitting sway of the hitch and implement in the operating position and eliminating sway in the full lift range of the hitch when the sway blocks are reversed right for left and left for right positions on the tractor.

It is a further object of this invention to provide a sway limiting device for a three-point hitch on a tractor having identical implement sway limiting blocks on the right and on the left-hand sides which permit sway in the operating position when a bevel side of the sway block is outboard and prevent sway of the hitch and implement when the single vertical side is facing outboard for engaging the inner surfaces of the lower draft arms.

The objects of this invention are accomplished by providing a drawbar bail mounted on the rearward side of the rear drive housing for swingably supporting the drawbar on the tractor. The lateral sides of the drawbar bail form a mounting surface for reversible sway limiting blocks. The three-point hitch is also mounted to the rear of the rear drive housing. The upper link and the lower draft arms are universally connected to the rear drive housing to permit transverse swaying as well as vertical swaying relative to the tractor. The reversible sway blocks are formed with surfaces on the inner and the outer sides adapted for engaging the lower draft arms or wear plates on the lower draft arms as they swing vertically. Preferably the plates are formed in an arcuate configuration adapted for forming an arc defining the arcuate motion of the portion of the draft arms which engage the wear plates. The sway blocks form vertical surfaces for engaging with the draft arms to prevent swaying of the hitch in the operating or raised or transport position. When the sway blocks are reversed side for side on the drawbar bail, double vertical surfaces connected by an intermediate beveled surface are exposed to engagement with the lower draft arms. This permits swaying of the hitch and implement in the lower or operating position and restricts sway in the raised or the vehicle travel position. Reversing of the sway blocks merely requires transferring the sway block to the opposite side of the tractor without rotating the sway block for repositioning the sway blocks for the desired operation of the three-point hitch. Transferring the sway block from one side of the tractor to the other does not require any storage of any parts or rotation of the sway blocks since the same bolts are used for fastening the sway block on either side of the tractor.

Referring to the drawings, the preferred embodiment of this invention is illustrated.

FIG. 3 illustrates a sectional view taken along line III—III of FIG. 6 of one of the lower draft arms and a sway block and the optional use with a wear plate on a three-point hitch;

FIG. 4 is a sectional view similar to FIG. 3 of the sway block mounted on the tractor without the wear plates;

Figure 5:
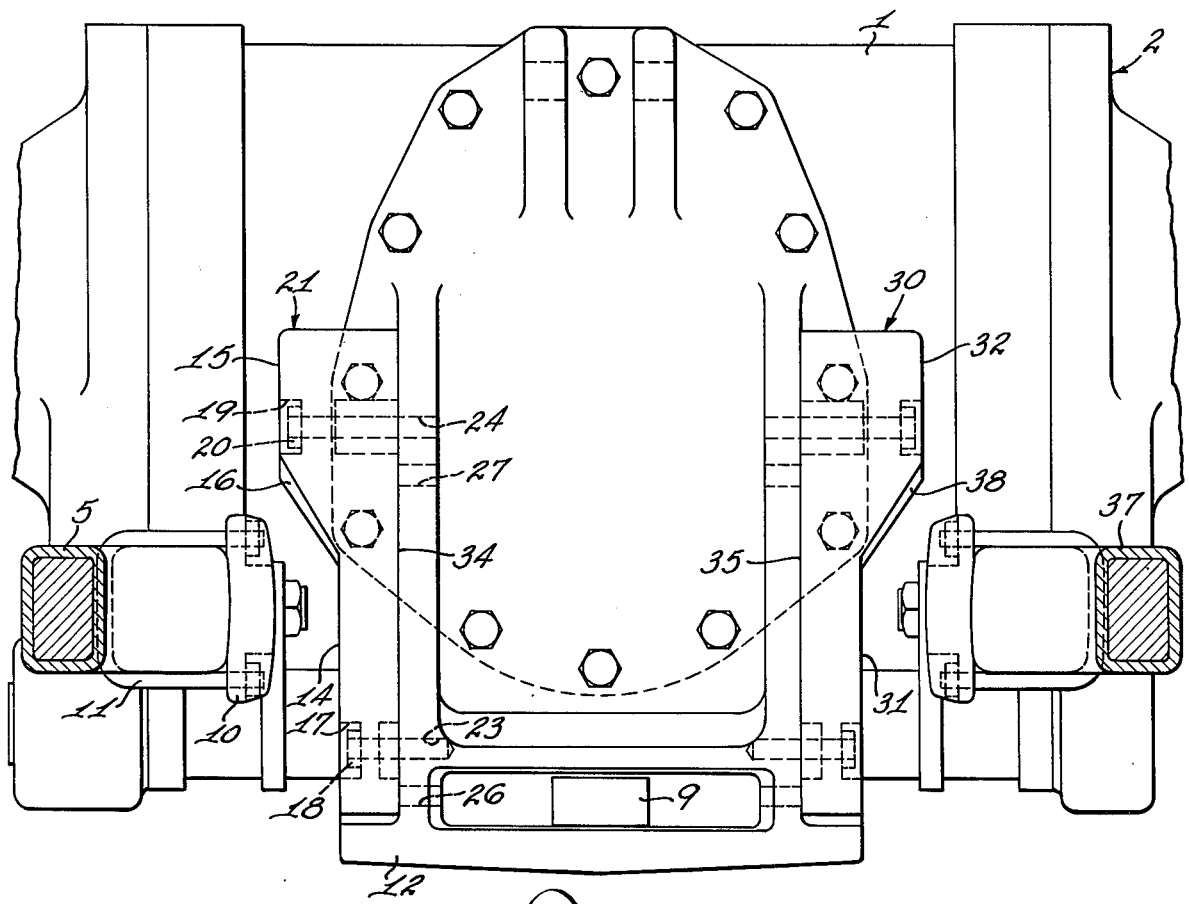
Figure 6:
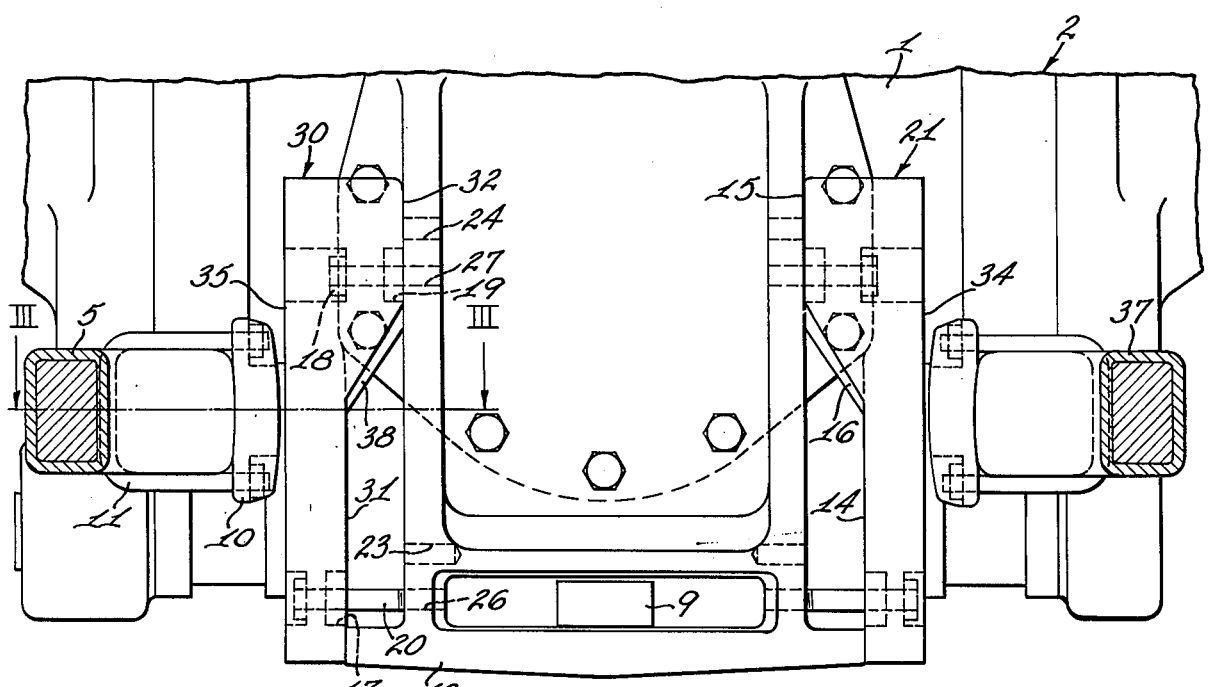

FIG. 5 is a rear view of the sway blocks mounted on the rear of the tractor with the sway blocks mounted in a position to allow swaying of the three-point hitch in the lower or operating position and preventing sway of the lower draft arms of the three-point hitch in the implement transport position; and FIG. 6 is a rear elevation view of the sway blocks mounted on the tractor in position to prevent sway of the draft arms in the implement field operating position and transport positions.

Figure 1:
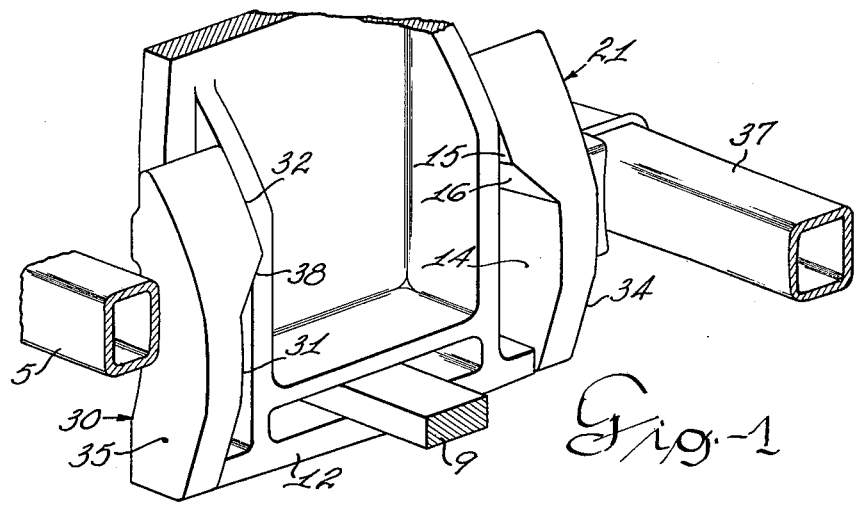
FIG. 1 is a three-dimensional view of the sway blocks mounted on the tractor.
Figure 2:
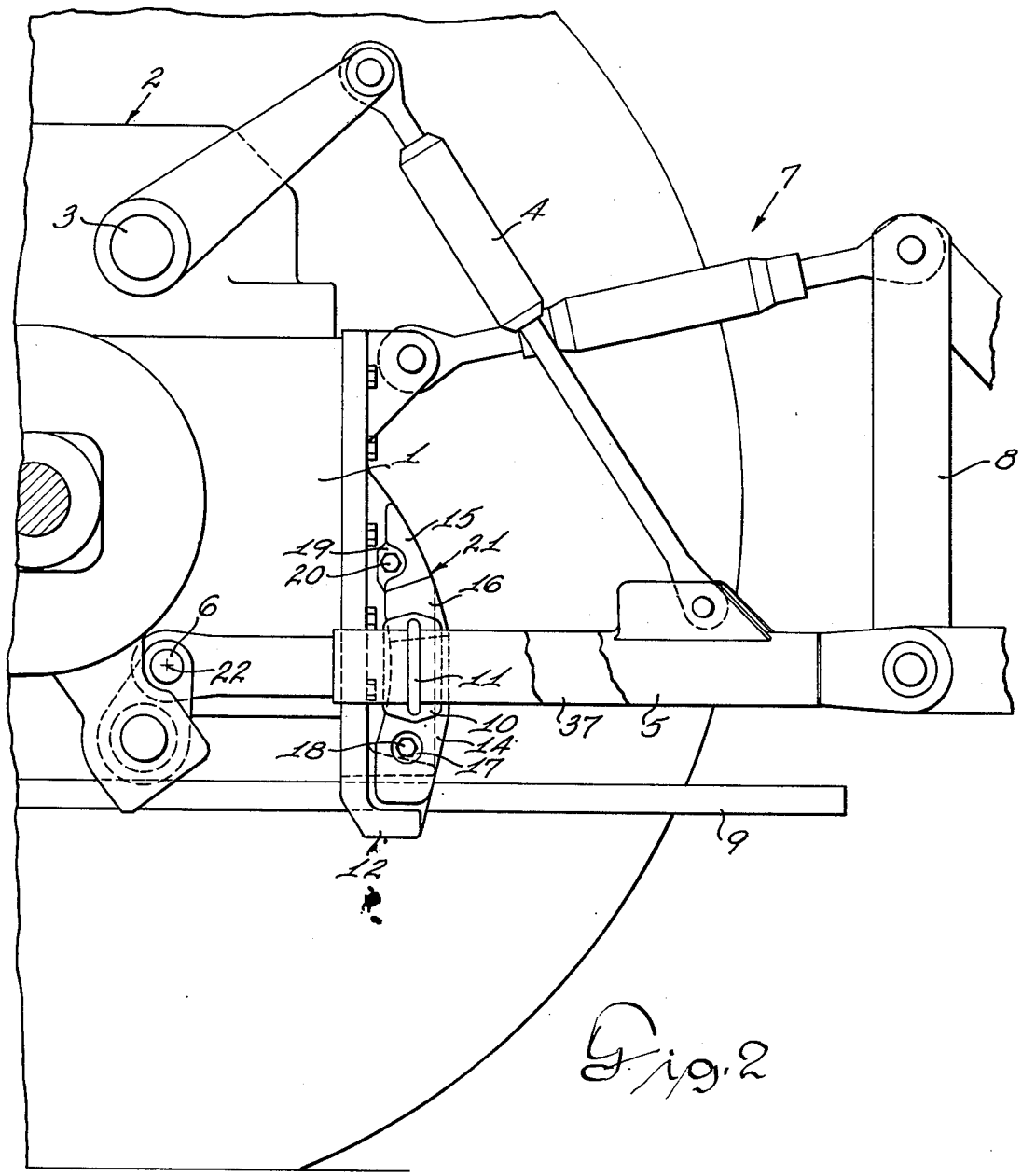
FIG. 2 illustrates a side elevation view of the three-point hitch and sway blocks mounted on a tractor.

Referring to the drawings, the rear drive housing 1 of the tractor 2 is shown. The rock shafts 3 are pivotally mounted on the rear drive housing 1 and are pivotally connected to the lift links 4 of which one is shown in FIG. 2. The lift link 4 is pivotally connected to the lower draft arm 5 for raising and lowering the three-point hitch by the hydraulic actuators in the tractor. The three-point hitch includes a rock arm on each side of the tractor pivotally connected through a lift link to a lower draft arm on each side of the tractor. The lower draft arm 5 is connected by the universal connection 6 to the tractor. The three-point hitch 7 is connected to an implement 8. The drawbar 9 is pivotally connected on its forward end to the underside of a rear drive housing 1. The lower draft arm 5 is shown in FIG. 2 with a wear plate 10 fastened by U-bolt 11 to the lower draft arm. The wear plate 10 is optional and does provide a hitch which is adapted for an additional category of hitch. FIGS. 3 and 4 show the optional use of the wear plates. The larger category positions for the lower draft arm 5 is shown with the wear plate 10 fastened by the U-bolt 11 to the lower draft arm 5. The two positions for categorys are shown with the draft arm spread transversely from the drawbar bail 12 by the thickness of the wear plate 10. Field operating position is spaced inwardly from the raised position as shown.

The sway blocks are shown in the drawings. FIG. 2 shows the side view of the sway block on the drawbar bail and FIGS. 5 and 6 show the rear view. A lower surface 14 is shown connected to an upper surface 15 by an adjoining bevel surface 16. The recess 17 receives the bolt 18 to avoid interference with the movement of the wear plate or the draft arm across the surface 14. Similarly, a recess 19 receives the bolt 20 to avoid interference with the sliding movement of the wear plate or lower draft arm when the draft arms are in the vehicle travel position. The left-hand sway block 21 is symmetrical with the right-hand sway block. The sway block 21 is generally formed in an arcuate configuration about a pivot point 22 which is the pivoting axis of the lower draft arm 5 in the vertical pivotal movement.

In FIG. 5 the surfaces are shown whereby the surface 14 is spaced inwardly relative to the surface 15 and connected with the adjoining bevel surface 16. The bolt 18 is shorter than bolt 20 and extends into the recess 17 and threadedly engaged the threaded opening 23 to firmly lock the sway block 21 on its lower end. Similarly, the bolt 20 is received within the recess 19 to firmly lock the upper end of the sway block 21 as it threadedly engages the threaded opening 24 on the upper portion of the drawbar bail 12. The threaded openings 26 and 27 are used for receiving the bolts 20 and 18, respectively, when the left-hand sway block 21 is moved to the right-hand side of the drawbar bail 12.

The right-hand sway block 30 is shown positioned in a similar manner on the right-hand side of the drawbar bail 12. The bolts fasten the sway block 30 in a manner whereby the lower draft arms are permitted to swing in the field operating position when the lower draft arms engage the surfaces 14 and 31 as shown. It can be seen that when the lower draft arms are lifted to the implement transport position they engage the surfaces 15 and 32 and sway of the draft arm is prevented.

FIG. 6 illustrates a view of the sway blocks 21, 30 transferred to opposite sides of the drawbar bale. In other words, the sway block 21 is positioned on the right-hand side and the sway block 30 is positioned on the left-hand side. In this position the lower draft arms engage the surfaces 34 and 35 of the sway blocks 21 and 30, respectively. The lower draft arms are not permitted to sway when the vehicle is being operated with the sway blocks in this position since the surface is vertical and, regardless of whether the hitch is in the operating or transport position, swaying of the hitch is prevented.

The operation of this device will be described in the following paragraphs.

The three-point hitch 7 is shown in the operating position with the implement 8 fastened to the rear end of the upper link and the lower draft arms. When the hitch is in the operating position, the draft arms engage the surfaces 14 of the sway block 21 and the surface 31 of the sway block 30. Wear plates are shown between the lower draft arms and the sway blocks in FIG. 5. Normally, the three-point hitch is operated in this manner in the field and the freedom of the swaying of the implement is normally tolerated since it trails the tractor and has the freedom of moving slightly in the event an obstacle is encountered.

When it is desired, the operator operates the hydraulic controls to lift the hitch and a portion of the implement and the lower draft arms 5 and 37 engage the surfaces 16 and 38 which centers the implement on the tractor as the lower draft arms engage the surfaces 15 and 32 in which the sway of the hitch and implement is prevented. This is normally considered the raised or travel position for the hitch and implement and it is desirable to keep the implement from swaying in this position.

If it is desirable for work with a power takeoff shaft to keep the implement from swaying in the operating position, the sway blocks 21 and 30 are transferred to the opposite sides of the drawbar bail 12. This position is shown in FIG. 6. It is noted that in this position the sway is prevented in either the operating position or the travel position since the surfaces 34 and 35 are continuous vertical surfaces which engage the lower draft arms regardless of whether they are in the operating position or in the raised or travel position.

It is understood that the implement connects between the two lower draft arms in its operating position. In other words, the dimension between the hitching point on the two lower draft arms is a constant dimension and, accordingly, as the lower draft arms are raised the swaying of the drawbars is restricted by the wider dimension between surfaces 15 and 32 on the upper portion of the sway blocks.

Referring to FIGS. 3 and 4, the two category positions of the lower draft arms are shown wherein the lower draft arm engages the surfaces of the sway blocks in one category position. The lower draft arms in another position carry the wear plates. The use of the wear plates space the draft arms to a wider dimension between the hitch point on the lower draft arms a larger category type hitching arrangement. This is shown in FIGS. 5 and 6 as well. The hitch as provided will accommodate either type of category hitches.

The embodiments of the invention in which an exclusive property or privilege is claimed are defined as follows:

1. A sway limiting device on a tractor having laterally spaced lower draft arms universally connected to the tractor for vertical and lateral swinging movement comprising, a tractor chassis, a sway limiting support means mounted on said chassis between said draft arms, a sway limiting block mounted on each of the laterally outward sides of said sway limiting support means, each of said sway limiting blocks defining a single bearing surface on one side and two vertically spaced bearing surfaces connected by an adjoining inclined surface on the other side, means selectively fastening a sway limiting block on each side of said support means with the single surface outwardly to restrict lateral swaying of the draft arms throughout the height of the blocks and selectively fastening one of the blocks on each of the sides of the support means with the two vertically spaced bearing surfaces outwardly to permit swaying of the draft arms in the lowered position and restrict swaying in the raised position to thereby provide interchangeable positioning of the blocks from side to side without any rotational movement of the blocks for utilizing the lateral surfaces of the sway blocks to control the swaying movement of the lower draft arms.

2. A sway limiting device on a tractor having laterally spaced lower draft arms universally connected to the tractor for vertical and lateral swinging movement as set forth in claim 1 wherein the single surface defines a continuous vertical surface.

3. A sway limiting device on a tractor having laterally spaced lower draft arms universally connected to the tractor for vertical and lateral swinging movement as set forth in claim 1 wherein said vertically spaced surfaces of said sway blocks define parallel vertical surfaces connected by said adjoining inclined surface intermediate the vertical surfaces.

4. A sway limiting device on a tractor having laterally spaced lower draft arms universally connected to the tractor for vertical and lateral swinging movement as set forth in claim 1 wherein said sway limiting support means mounted on said chassis between said draft arms defines a drawbar bail.

5. A sway limiting device on a tractor having laterally spaced lower draft arms universally connected to the tractor for vertical and swinging movement as set forth in claim 1 wherein said draft arms define the lower draft arms of a three-point hitch.

6. A sway limiting device on a tractor having laterally spaced lower draft arms universally connected to the tractor for vertical and lateral swinging movement as set forth in claim 1 wherein said fastening means for fastening each of said sway limiting blocks defines bolts for interchangeably positioning said sway blocks from side to side.

7. A sway limiting device on a tractor having laterally spaced lower draft arms universally connected to the tractor for vertical and lateral swinging movement as set forth in claim 1 wherein each of said sway limiting blocks defines an upper portion and a lower portion of unequal thickness connected by a tapered portion intermediate said upper and lower portion.

8. A sway limiting device on a tractor having laterally spaced lower draft arms universally connected to the tractor for vertical and lateral swinging movement as set forth in claim 1 including a wear plate on each of said draft arms for engaging mating sway limiting blocks.

9. A sway limiting device on a tractor having laterally spaced lower draft arms universally connected to the tractor for vertical and lateral swinging movement as set forth in claim 1 wherein each of said sway limiting blocks defines an arcuate configuration arcuate around the pivotal center of the lower draft arms.

10. A sway limiting device on a tractor having laterally spaced lower draft arms universally connected to the tractor for vertical and lateral swinging movement as set forth in claim 1 wherein said fastening means define a short and a long screw interchangeable for positioning on opposing sides of said sway limiting support means for fastening mating sway limiting blocks on either the right or the left side.

* * * * *